United States Patent
Lu et al.

(10) Patent No.: US 11,395,217 B2
(45) Date of Patent: Jul. 19, 2022

(54) METHODS AND APPARATUSES FOR NETWORK SELECTION

(71) Applicant: Telefonaktiebolaget LM Ericsson (publ), Stockholm (SE)

(72) Inventors: Qianxi Lu, Beijing (CN); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 16/336,491

(22) PCT Filed: Sep. 28, 2017

(86) PCT No.: PCT/CN2017/104059
§ 371 (c)(1),
(2) Date: Mar. 26, 2019

(87) PCT Pub. No.: WO2018/059506
PCT Pub. Date: Apr. 5, 2018

(65) Prior Publication Data
US 2021/0297939 A1    Sep. 23, 2021

(30) Foreign Application Priority Data
Sep. 30, 2016   (WO) ................ PCT/CN2016/101223

(51) Int. Cl.
*H04W 4/00*     (2018.01)
*H04W 48/18*    (2009.01)
(Continued)

(52) U.S. Cl.
CPC ............. *H04W 48/18* (2013.01); *H04W 4/40* (2018.02); *H04W 4/70* (2018.02); *H04W 76/14* (2018.02); *H04W 84/042* (2013.01)

(58) Field of Classification Search
CPC ........ H04W 48/18; H04W 4/70; H04W 76/14; H04W 4/40; H04W 84/042
(Continued)

(56) References Cited

U.S. PATENT DOCUMENTS 10,084,693 B2 *   9/2018   Kim .................. H04W 28/0215
10,299,107 B2 *   5/2019   Kim ..................... H04W 76/12
(Continued)

FOREIGN PATENT DOCUMENTS

CN     103380649 A     10/2013
CN     105210441 A     12/2015
(Continued)

OTHER PUBLICATIONS

European Search Report for European application No. 17854956.4 dated Jun. 3, 2020, 8 pages.
(Continued)

*Primary Examiner* — Marceau Milord
(74) *Attorney, Agent, or Firm* — Sage Patent Group (57) ABSTRACT

Embodiments of the present disclosure provide methods, apparatus and computer program products for network selection. A method implemented at a terminal device comprises obtaining an indication of a first carrier that provides cross-carrier configuration of a second carrier for device to device, D2D, communication; and selecting, from a list of authorized networks, a serving network based on the second carrier and the obtained indication. With embodiments of the disclosure, support for device to device communication can be improved.

20 Claims, 4 Drawing Sheets

(51) Int. Cl.
*H04W 4/70* (2018.01)
*H04W 76/14* (2018.01)
*H04W 4/40* (2018.01)
H04W 84/04 (2009.01)

(58) Field of Classification Search
USPC .......................................................... 370/329
See application file for complete search history.

(56) References Cited

U.S. PATENT DOCUMENTS

| | | | |
|---|---|---|---|
| 10,390,378 B2* | 8/2019 | Fodor | H04W 84/20 |
| 10,616,873 B2* | 4/2020 | McBeath | H04W 72/042 |
| 10,757,669 B2* | 8/2020 | Rahman | H04L 5/001 |
| 2010/0316146 A1* | 12/2010 | McBeath | H04L 5/0091 375/260 |
| 2013/0242911 A1* | 9/2013 | Heo | H04L 5/0048 370/329 |
| 2014/0044071 A1 | 2/2014 | Piggin et al. | |
| 2015/0131554 A1 | 5/2015 | Jiang et al. | |
| 2015/0156693 A1 | 6/2015 | Tabet et al. | |
| 2016/0143077 A1* | 5/2016 | Fodor | H04W 72/082 370/329 |
| 2016/0345334 A1* | 11/2016 | Veerepalli | H04W 48/08 |
| 2017/0367098 A1* | 12/2017 | Byun | H04W 92/16 |
| 2018/0041928 A1* | 2/2018 | Youn | H04L 49/90 |
| 2018/0092156 A1* | 3/2018 | Kim | H04W 72/0406 |
| 2018/0139593 A1* | 5/2018 | Chun | H04W 4/12 |
| 2018/0139797 A1* | 5/2018 | Chun | H04W 48/12 |
| 2018/0184270 A1* | 6/2018 | Chun | H04W 24/08 |
| 2019/0116586 A1* | 4/2019 | Basu Mallick | H04W 72/02 |
| 2020/0404456 A1* | 12/2020 | Byun | H04W 24/02 |

FOREIGN PATENT DOCUMENTS

| | | |
|---|---|---|
| CN | 105830523 A | 8/2016 |
| WO | WO 2015/170866 A1 | 11/2015 |

OTHER PUBLICATIONS

Huawei et al: "Support Multi-carrier Multi-PLMN Operations for PC5 Based V2X", 3GPP DRAFT; R2-164921, Aug. 21, 2016, XP051126595, 3 Pages.

International Search Report and Written Opinion of the International Searching Authority, PCT/CN2017/104059, dated Nov. 16, 2017, 8 pages.

* cited by examiner

METHODS AND APPARATUSES FOR NETWORK SELECTION

This application is a 35 U.S.C. § 371 national stage application of PCT International Application No. PCT/CN2017/104059 filed on Sep. 28, 2017, which in turn claims priority to PCT International Application No. PCT/CN2016/101223, filed on Sep. 30, 2016, the disclosures and content of which are incorporated by reference herein in their entirety.

TECHNICAL FIELD

The non-limiting and example embodiments of the present disclosure generally relate to the technical field of wireless communications, and specifically to methods, apparatuses and computer programs for network selection.

BACKGROUND

This section introduces aspects that may facilitate better understanding of the disclosure. Accordingly, the statements of this section are to be read in this light and are not to be understood as admissions about what is in the prior art or what is not in the prior art.

With the evolution of wireless communication, a requirement for supporting device to device (D2D) communication or "sidelink" features which targets at both commercial and Public Safety applications has been proposed. In the Third Generation Partnership Project (3GPP), the D2D communication feature has been introduced during the development of Release 12 (Rel-12) of the Long Term Evolution (LTE) standard. Some applications enabled by Rel-12 LTE include device discovery, where devices are able to sense the proximity of another device and an associated application by broadcasting and detecting discovery messages that carry device and application identities. Another application, for example proximity-based service (ProSe), consists of direct communication based on physical channels terminated directly between devices, mainly optimized for Mission Critical Push To Talk (MCPTT) services, that is, voice traffic for public safety cases.

In 3GPP LTE Rel-14, an extension for the D2D work consists of supporting Vehicle-to-X (V2X) communication, which includes direct communication among vehicles, pedestrians and infrastructure, for example, vehicle to vehicle (V2V), vehicle to pedestrians (V2P) and vehicle to infrastructure (V2I). V2X communications may carry both non-safety and safety information, where each of applications and services may be associated with a specific set of requirements, e.g., in terms of latency, reliability, capacity, etc.

V2X communication may take advantage of a network (NW) infrastructure, when available, but at least basic V2X connectivity should be possible even in the case of lacking network coverage. A network-based, for example LTE-based, V2X interface may be economically advantageous because of the LTE economies of scale and capability of tighter integration between communications with LTE NW infrastructure and V2X communications, as compared to using a dedicated V2X technology.

To benefit from the network-assisted D2D communication (i.e., D2D communication at least partly configured by the network), for example V2X communication, a terminal device capable of D2D communication may need to select a proper serving network.

SUMMARY

Various embodiments of the present disclosure mainly aim at providing methods, apparatuses and computer programs for network selection in a wireless communication system, particularly a wireless system supporting V2X communications. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a terminal device. The method comprises obtaining an indication of a first carrier that provides cross-carrier configuration of a second carrier for D2D communication and selecting, from a list of authorized networks, a serving network based on the second carrier and the obtained indication.

In one embodiment, the obtaining of the indication of the first carrier may be based on at least one of a pre-configuration, a signaling from a controlling network element in a core network, and a signaling from a serving network node of the terminal device. In another embodiment, the signaling from the controlling network element or the signaling from the serving network node may indicate at least one of: whether current network or cell supports said D2D communication or said cross-carrier configuration of the second carrier; a carrier that supports said cross-carrier configuration of the second carrier; and a network or cell associated with the carrier that supports said cross-carrier configuration of the second carrier. In a further embodiment, obtaining an indication of a first carrier may include obtaining the indication of the first carrier for a network in the list of authorized networks.

In some embodiments, selecting a serving network based on the second carrier and the obtained indication may include selecting one of a first network operating on the second carrier for the D2D communication, a second network operating on the first carrier providing cross-carrier configuration of the second carrier, and a third network if the first network and the second network are unavailable. In one embodiment, the selecting may include selecting the first network with a higher priority than the second network if the first network provides the cross-carrier configuration of the second carrier for D2D communication, and/or, selecting the second network with a higher priority than the first network if the first network does not provide the cross-carrier configuration of the second carrier for D2D communication.

In one embodiment, selecting a serving network may comprise selecting a serving PLMN and selecting a cell associated with the selected serving PLMN. In another embodiment, selecting of the cell may be based on at least one of: quality of a link from the cell to the terminal device, and a D2D communication mode supported by the cell.

It should be appreciated that in some embodiments, the second carrier or a serving network may not be associated with a PLMN, and in this case, the operation of selecting a PLMN may be omitted.

In a further embodiment, the method may further include searching for a network operating on the first carrier or the second carrier, with the selection of the third network.

In an embodiment, the selected serving network may not be operator managed.

In a second aspect of the disclosure, there is provided a method implemented at a network device. The method comprises transmitting, to a terminal device, an indication of a carrier providing cross-carrier configuration of a further carrier for device to device, D2D, communication. In one embodiment, the transmitting may include transmitting the indication via broadcast signaling.

In some embodiments, the D2D communication may include V2X communication.

In a third aspect of the disclosure, there is provided an apparatus that may be implemented in or as at least part of a terminal device. The apparatus comprises an obtaining unit, configured to obtain an indication of a first carrier that provides cross-carrier configuration of a second carrier for device to device, D2D, communication; and a selecting unit configured to select, from a list of authorized networks, a serving network based on the second carrier and the obtained indication.

In a fourth aspect of the disclosure, there is provided an apparatus that may be implemented in or as at least part of a network device. The apparatus comprises a transmitting unit configured to transmit, to a terminal device, an indication of a carrier providing cross-carrier configuration of a further carrier for device to device, D2D, communication.

In a fifth aspect of the disclosure, there is provided an apparatus that may be implemented at or as at least part of a terminal device. The apparatus may comprise a processor and a memory. The memory may contain instructions executable by the processor whereby the apparatus is operative to perform the method according to the first aspect of the present disclosure.

In a sixth aspect of the present disclosure, there is provided an apparatus that may be implemented at or as at least part of a network device. The apparatus may comprise a processor and a memory. The memory may contain instructions executable by the processor whereby the apparatus is operative to perform the method according to the second aspect of the present disclosure.

In a seventh aspect of the present disclosure, there is provided an apparatus that may be implemented at or as at least part of a terminal device. The apparatus may comprise processing means adapted to perform the method in accordance with the first aspect of the disclosure.

In an eighth aspect of the disclosure, there is provided an apparatus that may be implemented at or as at least part of a network device. The apparatus may comprise processing means adapted to perform the method in accordance with the second aspect of the disclosure.

In a ninth aspect of the disclosure, there is provided a computer program. The computer program comprises instructions which, when executed on at least one processor, cause the at least one processor to carry out the method according to the first aspect of the disclosure.

In a tenth aspect of the disclosure, there is provided another computer program. The computer program comprises instructions which, when executed on at least one processor, cause the at least one processor to carry out the method according to the second aspect of the disclosure.

According to the various aspects and embodiments as mentioned above, support for D2D communication may be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the phrase "wireless communication system" or "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices or between a network device and a terminal device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the phrase "network device" refers to a device in a wireless communication network via which a terminal device accesses the network and receives services therefrom. The network device may refer to a base station (BS), a node B (NodeB or NB), an evolved NodeB (eNodeB or eNB), a Remote Radio Unit (RRU), a radio head (RH), a remote radio head (RRH), a TRP (Transmission Reception Point), AN(access Node), a relay node (RN), or a low power node (LPN) such as a femto, a pico, an access point (AP) and so forth, depending on the applied terminology and technology.

The phrase "terminal device" refers to any end device having wireless communication capabilities. By way of example and not limitation, a terminal device may be referred to as user equipment (UE), which may be a Subscriber Station (SS), a Portable Subscriber Station, a Mobile Station (MS), or an Access Terminal (AT). The terminal device may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the phrases "terminal device", "terminal", "user equipment" and "UE" may be used interchangeably.

For illustrative purposes, several embodiments of the present disclosure will be described in the context of a 3GPP LTE system. Those skilled in the art will appreciate, however, that the concept and principle of embodiments of the present disclosure may be more generally applicable to other wireless networks, for example 3G CDMA-based network or a 5G or Next Radio (NR) system.

Figure 1:
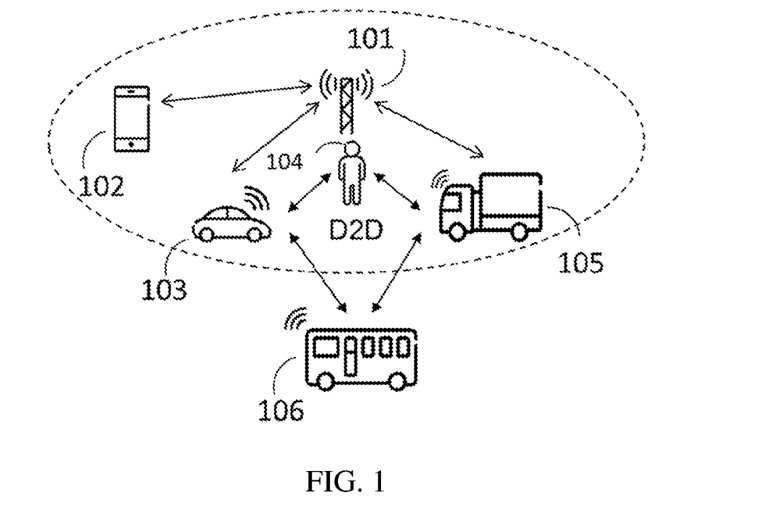
FIG. 1 illustrates a schematic D2D communication scenario based on an LTE network, in which embodiments of the present disclosure may be implemented.

FIG. 1 illustrates schematically a wireless communication system in which embodiments of the present disclosure may be implemented. As shown in FIG. 1, the wireless communication system 100 may include one or more network devices, for example network device 101, which may be in a form of an eNB. It would be appreciated that the network device 101 could also be in a form of a Node B, BTS (Base Transceiver Station), and/or BSS (Base Station Subsystem), AP and the like. The network device 101 may provide radio connectivity to a set of terminal devices, for example terminal devices 102 to 105, within coverage of its cell. Each cell is associated with an operator's network, e.g., a Public Land Mobile Network (PLMN). A terminal device (e.g., terminal device 103) may access the wireless communication system via the network device 101, or communicate with another terminal device (e.g., terminal device 104 or 106) directly via D2D. The term "D2D" as used herein refers to any type of device to device communication, including UE to UE communication, vehicle to vehicle communication and so on.

The network device 101 may control resource allocation for both cellular communication and D2D communication. For example, the network device 101 may send a resource grant (also referred to as a scheduling grant) to the terminal device 103, indicating which resource the terminal device 103 may use for its sidelink communication. Such D2D communication with a resource allocated by the network may be referred to as Mode 1 D2D communication. Alternatively, the network device 101 may only configure a resource pool for sharing by all D2D communications. In this scenario, a terminal device may select, from the resource pool, a resource for its D2D communication automatically, based on for example channel sensing or a cognitive radio technology. Such D2D communication with a resource selected from a resource pool by the terminal device itself may be referred to as Mode 2 D2D communication. The Mode 1 D2D communication usually provides better quality of service than the Mode 2 D2D communication.

To benefit from the network-based D2D communication, a terminal device capable of D2D communication may need to select a proper serving network. In 3GPP, specifications with respect to related non-access stratum (NAS) and access stratum (AS) procedures have been enhanced to support the D2D communication. For example, in 3GPP TS 23.122 V13.5.0, section 3.1B, a PLMN selection procedure which prioritizes the PLMNs associated with a ProSe carrier is specified. The ProSe carrier is a carrier configured to support ProSe service. Some descriptions in the TS 23.122 V13.5.0, section 3.1B are reproduced below:

iii) Among the PLMNs advertised by the E-UTRA cell operating in the radio resources provisioned to the MS for ProSe direct communication as specified in 3GPP TS 24.333 [52] or 3GPP TS 31.102 [40], the MS shall choose one allowable PLMN which:

1) provides radio resources for ProSe direct communication;
2) is in the list of authorised PLMNs for ProSe direct communication as specified in 3GPP TS 24.334 [51]; and
3) is not in the list of "PLMNs with E-UTRAN not allowed" as specified in subclause 3.1;

if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action.

Another example of 3GPP specification enhancement for supporting the D2D communication can be found in TS 36.304 V13.1.0, section 5.2.4.1, where a cell selection prioritizing cells operating on the ProSe carrier is specified. Some related descriptions in the TS 36.304 V13.1.0, section 5.2.4.1 are reproduced below:

If the UE capable of sidelink communication is configured to perform sidelink communication and can only perform the sidelink communication while camping on a frequency, the UE may consider that frequency to be the highest priority."

3GPP TS 36.331 V13.2.0, section 5.10.4 specifies that a resource control from an Evolved Universal Terrestrial Radio Access Network (E-UTRAN) cell is limited to a ProSe carrier, i.e., else (i.e. out of coverage on sidelink carrier):
   3> if priorityList is included for the entries of preconfigComm in SL-P reconfiguration defined in 9.3:
      4> configure lower layers to transmit the sidelink control information and the corresponding data using the one or more pools of resources indicated preconfigComm i.e. indicate all entries of this field to lower layers and in accordance with the timing of the selected SyncRef UE, or if the UE does not have a selected SyncRef UE, based on the UEs own timing;
   3> else:
      4> configure lower layers to transmit the sidelink control information and the corresponding data using the pool of resources that were preconfigured i.e. indicated by the first entry in preconfigComm in SL-P reconfiguration defined in 9.3 and in accordance with the timing of the selected SyncRef UE, or if the UE does not have a selected SyncRef UE, based on the UEs own timing However, with an evolvement of D2D communication, the procedures specified currently in 3GPP may not be optimal any longer, and inventors of the present disclosure have realized that additional factors should be taken into account during the network selection in order to well support the D2D communication.

For example, in a future wireless communication system (e.g., when ProSe evolves to V2x in 3GPP), a feature of cross-carrier configuration may be introduced, that is, a carrier configured for D2D communication may be cross-carrier configured by another carrier, either via a physical layer scheduling signaling or via a higher layer configuration signaling, e.g., radio resource control (RRC) signaling. It means that an E-UTRAN cell may not only control a D2D communication (e.g., over a PC5 interface specified in 3GPP) via its own operating carrier frequency, but also control the D2D communication via another carrier frequency. Therefore, a related NAS/AS procedure for a sidelink may need to be changed accordingly.

In addition, a wireless communication system may include a plurality of cells and each of the cells may have different capability for supporting the D2D communication. For example, a network device (e.g., the network device 101 shown in FIG. 1), and consequently an associated cell, may not support D2D communication, support one of Mode 1 and Mode 2 D2D communication, or support both D2D communication Modes.

By taking some of the above factors into account during a network selection, an optimized selection result may be obtained. In the present disclosure, methods, apparatuses and computer program products are provided to enable an enhanced network selection procedure. With embodiments of the present disclosure, support for D2D communication may be improved.

Figure 2A:
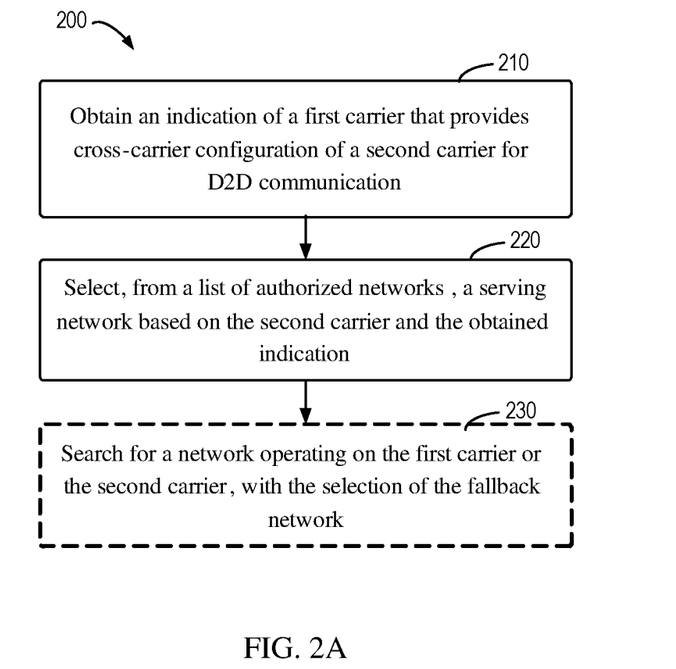
FIGS. 2A-2B illustrate flowcharts of a method implemented at a terminal device according to an embodiment of the present disclosure.

Reference is now made to FIG. 2A, which shows a flowchart of a method 200 according to an embodiment of the present disclosure. The method 200 may be implemented at a terminal device (e.g., any of the terminal devices 102-105 shown in FIG. 1). For simplicity, the method 200 will be described below with reference to the terminal device 103 as shown in FIG. 1. However, it is to be understood that the method 200 may also be implemented by other suitable terminal devices. In addition, though embodiments of the present disclosure can be implemented in the example network structure shown in FIG. 1, the scope of the present disclosure is not limited to a specific network infrastructure.

As shown in FIG. 2A, at block 210, the terminal device 103 obtains an indication of a first carrier that provides cross-carrier configuration of a second carrier for the D2D communication.

In an embodiment, at block 210, the terminal device 103 may obtain the indication of the first carrier based on at least one of a pre-configuration (for example in the universal integrated circuit card (UICC) and/or in the mobile entity (ME) of the terminal device), a signaling from a controlling network element in a core network, and a signaling from a serving network node of the terminal device. In an embodiment, the terminal device 103 may receive the indication of the first carrier from a serving network node as a part of a broadcasting signaling. For example, the terminal device 103 may receive the indication of the first carrier from a serving network node as a part of system information, e.g., via a system information block 21(SIB21) defined in 3GPP LTE. Alternatively, in another embodiment, the terminal device 103 may obtain the indication of the first carrier via a dedicated signaling, e.g., a dedicated radio resource control (RRC) signaling. In a further embodiment, at block 210, the terminal device 103 may obtain the indication of the first carrier from a controlling network element in a core network, for example from a V2X control function via a V3 interface specified by 3GPP.

In one embodiment, the first carrier may be a carrier that provides physical layer cross-carrier configuration for the second carrier, that is, physical layer scheduling information of the second carrier may be provided to the terminal device 103 via the first carrier. In another embodiment, the first carrier may provide, to the terminal device 103, cross-carrier configuration of the second carrier via a higher layer (e.g., a radio resource control (RRC) layer) signalling.

The second carrier is a carrier provisioned to the terminal device 103 for D2D communication, e.g., for V2X communication via the PC5 interface specified in 3GPP. In one embodiment, the second carrier may be the same carrier configured for a Prose service. In another embodiment, the second carrier may be different from the carrier for the Prose.

In one embodiment, the second carrier (and an associated network with the second carrier, e.g., a PLMN) which supports D2D communication (e.g., V2X communication over a PC5 interface) may be preconfigured. The terminal device may store the pre-configuration locally, for example.

In another embodiment, the terminal device 103 may acquire the indication of the second carrier in a similar way as that for obtaining the indication of the first carrier. For example, the indication/configuration of the second carrier may be provided to the terminal device 103 by a V2X control function via a V3 interface. Alternatively, the terminal device 103 may learn the second carrier (and an associated PLMN) from a broadcast signaling (e.g. a SIB21) provided by its serving cell in the serving PLMN.

A serving network (e.g., a PLMN) or a serving network device (e.g., the network device 101 shown in FIG. 1) of the terminal device 103 may not support the D2D communication (e.g., the V2X communication via PC5 interface) or may not provide cross-carrier configuration for a V2X carrier (e.g., the second carrier). With an embodiment of the present disclosure, in such a case, the serving PLMN or the serving network device 101 may indicate, to the terminal device 103, which is the carrier (and a related PLMN) where the D2D communication (e.g., V2X via PC5 interface) is supported, optionally, it can also indicate, to the terminal device 103, whether there is an E-UTRAN deployment on that carrier.

In another embodiment, the serving network device 101 may indicate, to the terminal device 103, whether there are carriers in neighboring frequencies (which may possibly belong to another PLMN) where cross-carrier configuration for V2X carriers is supported. That is, in some embodiments, at block 210, the terminal device 103 may obtain the indication of the first carrier (and/or the second carrier) based on a signaling from a controlling network element in a core network, and/or a signaling from a serving network node of the terminal device, and/or pre-configuration, for example, in the universal integrated circuit card (UICC) and/or in the mobile entity (ME) of the terminal device.

Furthermore, the signaling from the controlling network element or the signaling from the serving network node may provide one or more of the following information: whether current network or cell supports D2D communication on its operating carrier directly or it supports, on its operating carrier, cross-carrier configuration of another D2D carrier; a carrier that supports cross-carrier configuration of the second carrier; and a network or cell associated with the carrier that supports cross-carrier configuration of the second carrier. This allows the terminal device 103 to obtain information/indication of the first or second carrier from a network (or network device) associated with a further third carrier.

In still another embodiment, at block 210, the terminal device 103 may obtain the indication of the first carrier for a specific network in a list of authorized networks. In other words, the indication of the first carrier obtained by the terminal device 103 at block 210 may be per-network information. It means that the indicated of first carrier may be associated with a specific network (e.g., a PLMN). In one embodiment, the network device 101 may transmit indications of a plurality of first carriers to the terminal devices 103, each of the plurality of first carriers is capable of providing cross-carrier configuration of a D2D carrier (e.g., a carrier for V2X communication via PC5 interface) and associated with a corresponding network (e.g., a PLMN).

At block 220, based on the second carrier and the obtained indication of the first carrier, the terminal device 103 selects a serving network from a list of authorized networks. The list of authorized networks may be preconfigured, or signaled to the terminal device, for example in a similar way as that used for indicating the first carrier or second carrier. One or more of the authorized networks in the list may be operator-managed or non-operator managed. In other words, an authorized network in the list may be operated by one or more operators, or the authorized network is not managed by any operator. As a result, the selected serving network may or may not be operator managed.

By providing information on the first carrier, embodiments of the present disclosure enable the terminal device 103 to select a network which may be more suitable for the D2D communication than that selected using a conventional solution.

In one embodiment, the selection at block 220 may be performed when the terminal device 103 is configured to perform D2D communication. In another embodiment, the selection at block 220 may be performed when the terminal device needs to or wishes to perform the D2D communication.

At block 220, the terminal device 103 may select a serving network according to any suitable selection criteria, and embodiments of the present disclosure are not limited to any specific criteria or rules for the selection. Just for illustrative rather than limitation, some examples are provided below.

In one embodiment, at block 220, the terminal device 103 may select one of the following as the serving network: a first network operating on the second carrier for the D2D communication, a second network operating on the first carrier that provides cross-carrier configuration of the second carrier, and a third network if the first network and the second network are unavailable. The third network may be considered as a fallback network.

Both the first network and the second network can provide control for D2D communication of the terminal device103, and their difference lies in that the first network provides the control via its operating carrier while the second network provide the control via cross-carrier configuration of the second carrier from the first carrier. In one embodiment, the terminal device 103 may select the first network with a higher priority than the second network. For example, the terminal device 103 may select the serving network in the following order:

1) A first network (e.g., a PLMN) operating on the second carrier (e.g., carrier A), i.e. the carrier that supports D2D communication (e.g.,V2X over a PC5 interface);
2) A second network (e.g., a PLMN) operating on the first carrier, (e.g., carrier B) which provides cross-carrier configuration for the V2X carrier A; the carrier B may be (but not limited to) an LTE carrier used for Uu operations, i.e., cellular communication between a network device and a terminal device; and
3) A third network (e.g., a PLMN) operating on neither carrier A nor carrier B.

In an embodiment, the terminal device 103 may select the first network with a higher priority than the second network and the third network, if the first network provides the cross-carrier configuration of the second carrier for D2D communication. Alternatively, or in addition, in some embodiments, the terminal device 103 may select the second network with a higher priority than the first network and the third network if the first network does not provide the cross-carrier configuration of the second carrier for D2D communication.

With the above order, when both the first network and the second network are available, the terminal device 103 will select the first network as the serving network, and only when both the first network and the second network are unavailable, the terminal device may choose the third network as the serving network. In this case, the third network may be considered as a fallback network.

In one embodiment, the terminal device 103 may consider the selection of the third network as a temporary selection, and then monitors (or searches for) a network satisfying the above condition 1) or 2) after selecting the third network at block 220. That is, the terminal device 103 may search for (or reselect) a network operating on the first carrier or the second carrier once the third network is selected. For example, optionally, terminal device 103 may search for the first network or the second network periodically at block 230 if a third network is selected at block 220, until the first network or the second network is found, or a predefined maximum searching time threshold is reached.

Figure 2B:
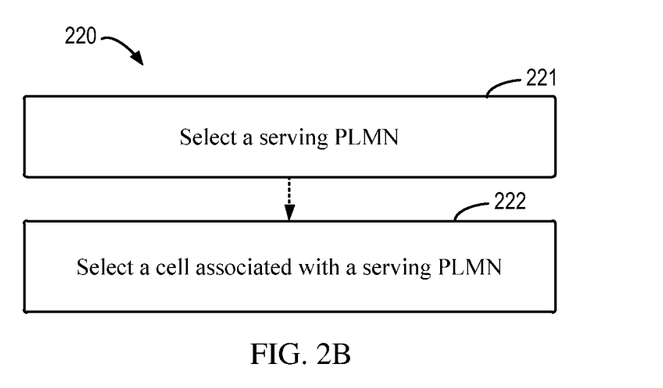

Now reference is made to FIG. 2B which illustrates some optional implementations of block 220 shown in FIG. 2A. As shown in FIG. 2B, in an embodiment, selecting a serving network at block 220 may include selecting a serving PLMN at block 221. During selection of the PLMN at block 221, besides the above selection priorities, the terminal device 103 may optionally take more factors into account during the network selection. For example, the terminal device 103 may first determine a plurality of networks (e.g., PLMNs) with the above priority 1), and then select a network from the plurality of networks based on a further criterion. For instance, the terminal device may further choose the PLMN by following a procedure specified in 3GPP TS 23.122, that is, choose an allowable PLMN which:

1) provides radio resources for ProSe direct communication;
2) is in the list of authorised PLMNs for ProSe direct communication as specified in 3GPP TS 24.334; and
3) is not in the list of "PLMNs with E-UTRAN not allowed" as specified in subclause 3.1.

As shown in FIG. 2B, in another embodiment, selecting a serving network at block 220 may include selecting a serving PLMN at block 221 and selecting a cell associated with the selected serving PLMN at block 222. However, neither block 221 nor block 222 is mandatory for the block 220. Embodiments of the present disclosure are not limited to any specific way for selecting any specific network based on the second carrier and the obtained indication of the first carrier at block 220. For example, in another embodiment, the selecting a serving network at block 220 may only include selecting a serving cell for a given PLMN at block 222.

In an embodiment, there may be a plurality of cells associated with a selected/given serving network (e.g., serving PLMN). In such case, at block 222, the terminal device 103 may select a cell associated with a selected/given serving PLMN in the following order:

1) A cell operating on the carrier A that supports D2D communication;
2) A cell operating on the carrier B which provides cross-carrier configuration of the carrier A, where the information as to whether a cell supports cross-carrier configuration or not may be known by the terminal device via an AS indication signaling; and
3) A cell operating on neither carrier A nor carrier B.

Similar to what is described with reference to a PLMN selection, at block 230, the terminal device 103 may monitor (periodically or aperiodically) a cell satisfying the above condition a) or b) if a cell satisfying condition c) is selected at block 222, in order to find/reselect a cell that can support D2D communication better. This embodiment enables the terminal device 103 to re-prioritize the cell selection according to the prioritization order above.

In another embodiment, when there are a plurality of cells associated with a selected/given serving network (e.g., serving PLMN), then at a block 222, the terminal device 103 may select a cell based on quality of a link from the cell to the terminal device 103, and/or based on a D2D communication mode supported by the cell.

It should be appreciated that in some embodiments, the second carrier or a serving network may not be associated with a PLMN, and in this case, the operations of selecting a PLMN and a cell associated with the PLMN in blocks 221 and 222 may be omitted.

For example, the terminal device may select a cell supporting mode 1 D2D communication with a higher priority than a cell only supporting mode 2 D2D communication. Since when a V2V carrier is congested, the usage of a mode-2 resource pool may not ensure a satisfactory QoS for D2D communication. In one embodiment, a network device (e.g., an eNB) may indicate, to the terminal device 103, that cross-carrier configuration (e.g., including cross-carrier scheduling in physical layer and/or higher layer configuration) over the V2X carrier is supported but it does not provide any mode-2 pool configuration for operating over the V2X carrier. In such case, the UE may need to request dedicated resources from an E-UTRAN to operate on the V2X carrier on PC5 interface.

In another embodiment, in case the terminal device 103 is in coverage of multiple cells, and all of the multiple cells are capable of providing cross-carrier configuration for the V2X carrier, the UE may prioritize selection of a cell providing mode-1 cross-carrier configuration, e.g., via physical layer cross-carrier scheduling signaling. In a further embodiment, when there are multiple cells providing mode-1 (or mode-2) cross-carrier configuration, the terminal device 103 may prioritize selection of a cell with better quality (e.g. RSRP) according to cell (re)selection criteria. For example, the terminal device 103 may select a cell with maximum received RSRP as the serving cell.

Some of the embodiments for cell selection enable the terminal device 103 to select a cell that can provide higher QoS for the D2D communication.

Figure 3:
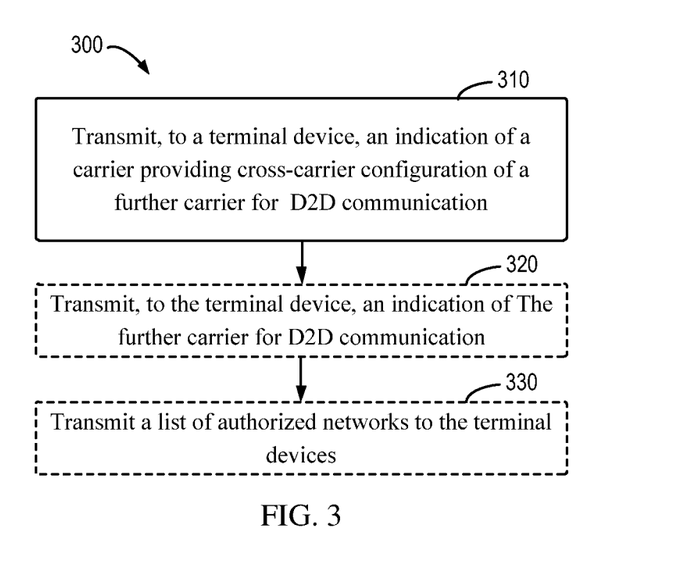
FIG. 3 illustrates a flowchart of a method implemented at a network device according to another embodiment of the present disclosure.

Now reference is made to FIG. 3 which shows a flowchart of a method 300 according to an embodiment of the present disclosure. The method 300 may be implemented at or as at least part of a network device (e.g., the network device 101 shown in FIG. 1). For simplicity, the method 300 will be described below with reference to the network device 101 shown in FIG. 1. However, it is to be understood that the method 300 may also be implemented by any other suitable network devices.

As shown in FIG. 3, at block 310, the network device 101 transmits, to a terminal device, an indication of a carrier that provides cross-carrier configuration of a further carrier for D2D communication. The method 300 enables the terminal device to be aware of another carrier that can control the D2D communication, besides the carrier provisioned to it for D2D communication. This information can be taken into account during a network selection procedure for an enhancement of the selection.

In one embodiment, the further carrier for D2D communication may be preconfigured and thus known to the terminal device without additional signaling. Alternatively, the network device 101 may indicate the further carrier to the terminal device via a broadcast or dedicated signaling, for example at block 320.

In one embodiment, the carrier and the further carrier may be the first carrier and the second carrier described with reference to method 200, and therefore, descriptions with respect to approaches for communicating the first carrier and the second carrier provided with reference to method 200 and FIGS. 2A and 2B also apply here and details will not be repeated.

In one embodiment, the indication of the carrier transmitted by the network device 101 at block 310 may be per-network information, that is to say, the carrier indicated may be associated with a specific network. Then in one embodiment, at block 310, the network device 101 may transmit indications of a plurality of carriers to the terminal devices 103, each of the plurality of carriers is capable of providing cross-carrier configuration of a D2D carrier (e.g., a carrier for V2X communication via PC5) and associated with a corresponding network (e.g., a PLMN).

In another embodiment, at an optional block 330, the network device 101 may transmit a list of authorized networks to the terminal devices for the terminal device to select from. Such an operation can be avoided in another embodiment where the list of authorized networks is preconfigured.

Figure 4:
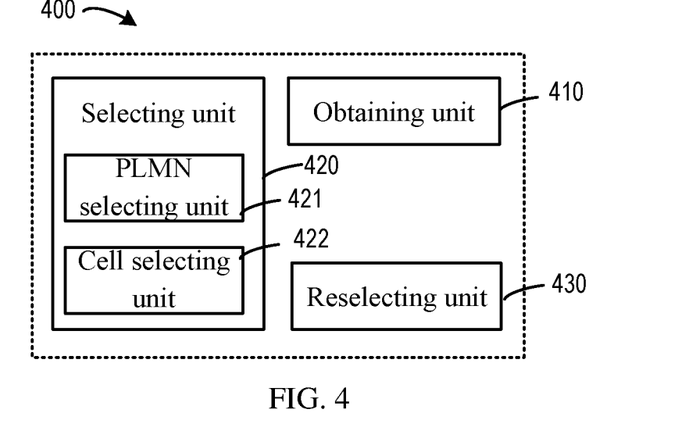
FIG. 4 illustrates a simplified block diagram of an apparatus implemented in/as a network device according to an embodiment of the present disclosure.

FIG. 4 illustrates a schematic block diagram of an apparatus 400 implemented in/as at least part of a terminal device, for example, one of the terminal devices 102-105 shown in FIG. 1. The apparatus 400 is operable to carry out the example method 200 described with reference to FIGS. 2A and 2B and possibly any other processes or methods. It is also to be understood that the method 200 is not necessarily carried out by the apparatus 400. At least some blocks of the method 200 can be performed by one or more other entities.

As illustrated in FIG. 4, the apparatus 400 includes an obtaining unit 410, configured to obtain an indication of a first carrier that provides cross-carrier configuration of a second carrier for D2D communication; and a selecting unit 420, configured to select, from a list of authorized networks, a serving network based on the second carrier and the obtained indication. The selected serving network may be an operator managed network, or a network not managed by any operator.

In one embodiment, the obtaining unit 410 and the selecting unit 420 may be configured to perform functions/operations described with reference to block 210 and 220 of method 200 respectively, and therefore descriptions with respect to the first carrier, the second carrier and their acquisition provided with reference to method 200 and FIGS. 2A and 2B also apply here and details will not be repeated for simplicity.

Just for illustration, in one embodiment, the obtaining unit 410 may be configured to obtain the indication based on at least one of: a pre-configuration, a signaling from a controlling network element in a core network, and a signaling from a serving network node of the terminal device. In an embodiment, the pre-configuration may be coded in the universal integrated circuit card (UICC) and/or in the mobile entity (ME) of the apparatus 400. In one embodiment, the signaling from the controlling network element or the signaling from the serving network node indicates at least one of: whether current network or cell supports said D2D communication or said cross-carrier configuration of the second carrier; a carrier that supports said cross-carrier configuration of the second carrier; and a network or cell associated with the carrier that supports said cross-carrier configuration of the second carrier.

In an embodiment, the obtaining unit 410 may be configured to obtain the indication of the first carrier for a network in the list of authorized networks. In this embodiment, the indication of the first carrier obtained by the obtaining unit 410 is network specific. That is to say, the indicated first carrier may be associated with a specific network (e.g., a PLMN).

In another embodiment, the selecting unit 420 may be configured to select one of a first network operating on the second carrier for the D2D communication, a second network operating on the first carrier providing cross-carrier configuration of the second carrier, and a third network if the first network and the second network are unavailable, as the serving network. For example, without limitation, the selecting unit may be configured to select the first network with a higher priority than the second network. In an embodiment, the selecting unit may be configured to select the first network with a higher priority than the second network and the third network if the first network provides the cross-carrier configuration of the second carrier for D2D communication, and/or, select the second network with a higher priority than the first network and the third network if the first network does not provide the cross-carrier configuration of the second carrier for D2D communication.

Optionally, the apparatus 400 may further comprise a reselecting unit 430, configured to search for a network operating on the first carrier or the second carrier, if a third network is selected currently. The searching may be performed by the reselecting unit periodically or aperiodically by the reselection unit 430. For instance, the reselecting unit 430 may search for the first network or the second network periodically, until the first network or the second network is found, or a predefined maximum searching time is reached.

In some embodiments, the selecting unit 420 may include one or both of a PLMN selecting unit 421 and a cell selecting unit 422. The PLMN selecting unit 421 may be configured to select a serving PLMN, and the cell selecting unit 422 may be configured to select a cell associated with a selected/given serving PLMN. That is to say, the selecting unit 420 may be configured to select both a PLMN and an associated cell in one embodiment. In another embodiment, the selecting unit 420 may be configured a cell associated with a given PLMN using the cell selection unit 422.

It should be appreciated that in some embodiments, the second carrier or a serving network may not be associated with a PLMN, and in this case, PLMN selecting unit 421 and a cell selecting unit 422 may be omitted.

Embodiments are not limited to any specific rules for the cell selection, and just for illustrative purpose, the cell selecting unit 422 may be configured to select a cell based on at least one of: quality of a link from the cell to the terminal device, and a D2D communication mode supported by the cell.

Figure 5:
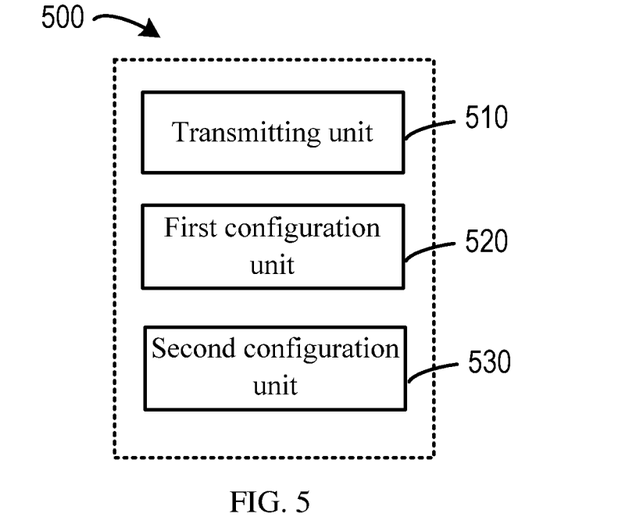
FIG. 5 illustrates a simplified block diagram of an apparatus implemented in/as a terminal device according to an embodiment of the present disclosure.

FIG. 5 illustrates a schematic block diagram of an apparatus 500 implemented in/as at least part of a network device, for example, the network device 101 shown in FIG. 1. The apparatus 500 is operable to carry out the example method 300 described with reference to FIG. 3 and possibly any other processes or methods. It is also to be understood that the method 300 is not necessarily carried out by the apparatus 500. At least some blocks of the method 300 can be performed by one or more other entities.

As illustrated in FIG. 5, the apparatus 500 includes a transmitting unit 510 configured to transmit, to a terminal device, an indication of a carrier providing cross-carrier configuration of a further carrier for D2D communication (e.g., V2X communication via PC5 interface). The transmitting unit 510 may transmit the indication to the terminal device via a broadcast signaling or a dedicated signaling. The indication of the carrier may be used by the terminal device during a network selection procedure.

Optionally, in another embodiment, the apparatus 500 may further comprise a first configuration unit 520, which is configured to indicate the further carrier for D2D communication to the terminal device 103. In a further embodiment, the further carrier provisioned to the terminal device for D2D communication may be preconfigured, and in this case, the first configuration unit 520 may be omitted.

In one embodiment, the apparatus may include a second configuration unit 530 configured to indicate to the terminal device a list of authorized networks for the terminal device to select from. In another embodiment, the list of authorized networks may be preconfigured, or may be transmitted to the terminal device by the transmitting unit 510 or the first configuration unit 520, and therefore the second configuration unit 530 may be omitted.

Figure 6:
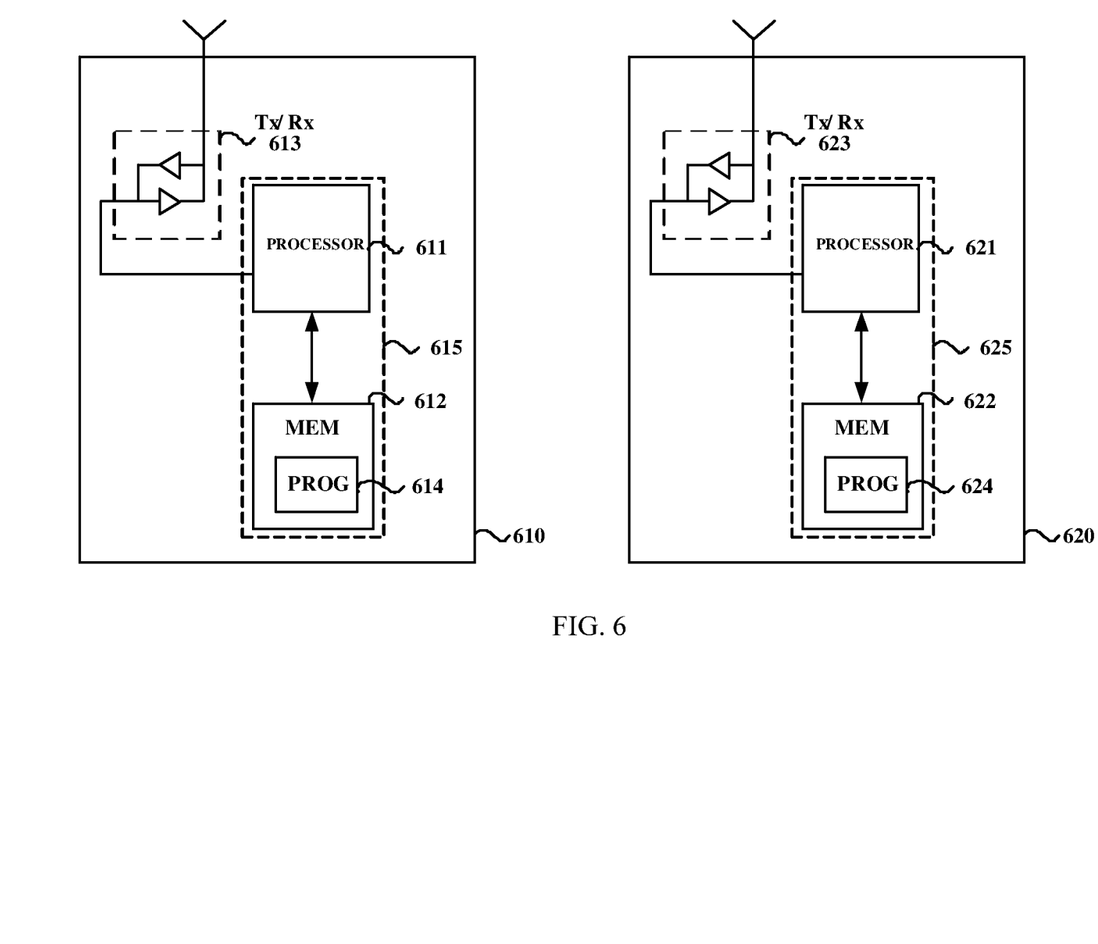
FIG. 6 illustrates simplified block diagrams of an apparatus in a network device and a terminal device, according to an embodiment of the present disclosure.

FIG. 6 illustrates a simplified block diagram of an apparatus 610 that may be embodied in/as at least part of a network device, e.g., the network device 101 shown in FIG.

1, and an apparatus 620 that may be embodied in/as at least part of a terminal device, e.g., one of the terminal devices 102-103 shown in FIG. 1.

The apparatus 610 may include at least one processor 611, such as a data processor (DP) and at least one memory (MEM) 612 coupled to the processor 611. The apparatus 610 may further include a transmitter TX and receiver RX 613 coupled to the processor 611. The MEM 612 may be non-transitory machine/processor/computer readable storage medium and it may store a program (PROG) 614. The PROG 614 may include instructions that, when executed on the associated processor 611, enable the apparatus 610 to operate in accordance with the embodiments of the present disclosure, for example to perform the method 300. A combination of the at least one processor 611 and the at least one MEM 612 may form processing means 615 adapted to implement various embodiments of the present disclosure.

The apparatus 620 includes at least one processor 621, such as a DP, and at least one MEM 622 coupled to the processor 621. The apparatus 620 may further include a suitable TX/RX 623 coupled to the processor 621. The MEM 622 may be non-transitory machine/processor/computer readable storage medium and it may store a PROG 624. The PROG 624 may include instructions that, when executed on the associated processor 621, enable the apparatus 620 to operate in accordance with the embodiments of the present disclosure, for example to perform the method 200. A combination of the at least one processor 621 and the at least one MEM 622 may form processing means 625 adapted to implement various embodiments of the present disclosure.

Various embodiments of the present disclosure may be implemented by computer program executable by one or more of the processors 611 and 621, software, firmware, hardware or in a combination thereof.

The MEMs 612 and 622 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 611 and 621 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a NW controlled/assisted D2D communication scenario, it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules or units), or combinations thereof. For a firmware or software, implementation may be made through modules or units (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a terminal device, the method comprising:
obtaining an indication of a first carrier that provides cross-carrier configuration of a second carrier for device to device ("D2D") communication, the first carrier being different than the second carrier; determining the cross-carrier configuration of the second carrier for D2D communication based on the first carrier; and selecting a serving network from a list of authorized networks based on the second carrier and the indication, wherein selecting the serving network comprises selecting: a first network in response to the first network providing the cross-carrier configuration of the second carrier for D2D communication, a second network in response to the first network not providing the cross-carrier configuration of the second carrier for D2D communication, or a third network in response to the first network and the second network being unavailable.

2. The method of claim 1, wherein obtaining an indication of the first carrier comprises:
obtaining the indication based on at least one of:
a pre-configuration,
a signaling from a controlling network element in a core network, and
a signaling from a serving network node of the terminal device.

3. The method of claim 2, wherein the signaling from the controlling network element or the signaling from the serving network node indicates at least one of:
whether a current network supports the D2D communication or the cross-carrier configuration of the second carrier;
a third carrier that supports the cross-carrier configuration of the second carrier; and
a network associated with the third carrier.

4. The method of claim 1, wherein obtaining the indication of the first carrier comprises:
obtaining the indication of the first carrier for a network in the list of authorized networks.

5. The method of claim 1, wherein selecting the serving network based on the second carrier and the indication comprises selecting one of: the first network operating on the second carrier for the D2D communication, the second network operating on the first carrier providing cross-carrier configuration of the second carrier, and the third network in response to the first network and the second network being unavailable.

6. The method of claim 5, wherein selecting comprises:
selecting the first network with a higher priority than the second network and the third network in response to the first network providing the cross-carrier configuration of the second carrier for D2D communication, or
selecting the second network with a higher priority than the first network and the third network in response to the first network not providing the cross-carrier configuration of the second carrier for D2D communication.

7. The method of claim 5, further comprising:
responsive to selecting the third network, searching for a network operating on the first carrier or the second carrier.

8. The method of claim 1, wherein selecting the serving network comprises:

selecting a serving public land mobile network ("PLMN"); and
selecting a cell associated with the serving PLMN.

9. The method of claim 8, wherein selecting the cell associated with the serving PLMN comprises:
selecting the cell based on at least one of:
a quality of a link from the cell to the terminal device, and
a D2D communication mode supported by the cell.

10. The method of claim 1, wherein selecting the serving network comprises:
selecting a non-operator managed serving network based on the second carrier and the indication.

11. A method implemented at a network device, the method comprising:
transmitting, to a terminal device, an indication of a first carrier providing cross-carrier configuration of a second carrier for device to device ("D2D") communication, the first carrier being different than the second carrier, and instructions to cause the terminal device to:
determine the cross-carrier configuration of the second carrier for D2D communication based on the first carrier; and select a serving network from a list of authorized networks based on the second carrier and the indication by selecting: a first network in response to the first network providing the cross-carrier configuration of the second carrier for D2D communication, a second network in response to the first network not providing the cross-carrier configuration of the second carrier for D2D communication, or a third network in response to the first network and the second network being unavailable.

12. An apparatus implemented at a terminal device, the apparatus comprising:
processing circuitry; and memory coupled to the processing circuitry and having instructions stored therein that are executable by the processing circuitry to cause the terminal device to perform operations comprising:
obtaining an indication of a first carrier that provides cross-carrier configuration of a second carrier for device to device ("D2D") communication, the first carrier being different than the second carrier; determining the cross-carrier configuration of the second carrier for D2D communication based on the first carrier; and selecting a serving network from a list of authorized networks based on the second carrier and the indication,
wherein selecting the serving network comprises selecting: a first network in response to the first network providing the cross-carrier configuration of the second carrier for D2D communication, a second network in response to the first network not providing the cross-carrier configuration of the second carrier for D2D communication, or a third node in response to the first network and the second network being unavailable.

13. The apparatus of claim 12, wherein obtaining an indication of the first carrier comprises:
obtaining the indication based on at least one of:
a pre-configuration,
a signaling from a controlling network element in a core network, and
a signaling from a serving network node of the terminal device.

14. The apparatus of claim 13, wherein the signaling from the controlling network element or the signaling from the serving network node indicates at least one of:

whether a current network supports the D2D communication or the cross-carrier configuration of the second carrier;
a third carrier that supports the cross-carrier configuration of the second carrier; and
a network associated with the third carrier.

15. The apparatus of claim 12, wherein obtaining the indication of the first carrier comprises:
obtaining the indication of the first carrier for a network in the list of authorized networks.

16. The apparatus of claim 12, wherein selecting the serving network based on the second carrier and the indication comprises selecting one of: the first network operating on the second carrier for the D2D communication, the second network operating on the first carrier providing cross-carrier configuration of the second carrier, and the third network in response to the first network and the second network being unavailable.

17. The apparatus of claim 16, wherein selecting comprises:
selecting the first network with a higher priority than the second network and the third network in response to the first network providing the cross-carrier configuration of the second carrier for D2D communication, or
selecting the second network with a higher priority than the first network and the third network in response to the first network not providing the cross-carrier configuration of the second carrier for D2D communication.

18. The apparatus of claim 16, the operations further comprising:
responsive to selecting the third network, searching for a network operating on the first carrier or the second carrier.

19. The apparatus of claim 12, wherein selecting the serving network comprises:
selecting a serving public land mobile network ("PLMN"); and
selecting a cell associated with the serving PLMN,
wherein selecting the cell associated with the serving PLMN comprises:
selecting the cell based on at least one of:
a quality of a link from the cell to the terminal device, and
a D2D communication mode supported by the cell.

20. The apparatus of claim 12, wherein selecting the serving network comprises:
selecting a non-operator managed serving network based on the second carrier and the indication.

* * * * *